United States Patent [19]

Whitehead

[11] Patent Number: 4,883,341
[45] Date of Patent: Nov. 28, 1989

[54] NON-REFLECTIVE GRAPHIC SURFACE DISPLAY DEVICE

[75] Inventor: Lorne A. Whitehead, Vancouver, Canada

[73] Assignee: Tir Systems LTD, Canada

[21] Appl. No.: 169,292

[22] Filed: Mar. 17, 1988

[30] Foreign Application Priority Data

Apr. 24, 1987 [CA] Canada ................................. 535569

[51] Int. Cl.$^4$ ........................... G02B 3/08; G02B 5/04
[52] U.S. Cl. ................................. 350/276 R; 350/452
[58] Field of Search .................. 350/276 R, 452, 451, 350/167, 286

[56] References Cited

U.S. PATENT DOCUMENTS 4,657,355  4/1987  Negishi ................................. 350/452

Primary Examiner—Bruce Y. Arnold
Assistant Examiner—Rebecca D. Gass
Attorney, Agent, or Firm—Lerner, David, Littenberg, Krumholz & Mentlik

[57] ABSTRACT

A graphic surface display device comprises a graphic surface be displayed and a cover of substantially transparent material overlying and in optical contact with the graphic surface. The cover has a minutely textured outer surface such that the angle between a first vector normal to a randomly selected point on the cover's surface; and, a second vector which passes through the selected point and which is normal to a plane tangential to the graphic surface at the point of intersection of the second vector with the graphic surface; has substantially unity probability of exceeding 45°.

27 Claims, 1 Drawing Sheet

NON-REFLECTIVE GRAPHIC SURFACE DISPLAY DEVICE

FIELD OF THE INVENTION

This application pertains to a non-reflective graphic surface display device whereby a graphic surface may be viewed in the absence of reflective glare.

BACKGROUND OF THE INVENTION

As used herein, the term "graphic surface" means a surface whose light absorptivity varies as a function of position on the surface so as to create the appearance of an image on the surface. Examples include paintings, photographs, posters, prints and the like which are conventionally displayed by mounting them beneath a protective glass or plastic cover. Such covers reflect incident light into the observer's eyes, so the observer must subconsciously ignore reflected images which appear in the plane of the cover. Human observers naturally "train" themselves from an early age to subconsciously ignore reflected images of this sort. However, the reflected images are always present and, in the case of particularly bright reflections, may inhibit the observer's ability to see the graphic surface clearly.

Various anti-glare or anti-reflective graphic surface covers such as low glare glass are known in the prior art. However, these do not eliminate reflected glare; they merely scatter reflected light in a multiplicity of directions, so that the observer does not perceive a sharp reflected image, but perceives only a substantially blurred reflection, which is easier to subconsciously ignore. Unfortunately, even though the substantially blurred reflection is easier to ignore, it still very greatly reduces the level of contrast in the perceived image.

The prior art has also evolved a variety of anti-reflective coatings such as those which are commonly applied to camera lenses. However, such coatings are expensive and fragile. They are thus not well suited to use in general purpose graphic surface display situations.

The present invention provides an anti-reflective graphic surface display device which substantially eliminates reflective glare, without blurring or otherwise significantly distorting the quality of the displayed image, and which is relatively inexpensive and durable, thus rendering the invention well suited to use in a wide variety of graphic surface display situations.

SUMMARY OF THE INVENTION

The invention provides a graphic surface display device comprising a graphic surface to be displayed and a cover of substantially transparent material overlying the graphic surface. The cover has a minutely textured outer surface such that an angle $\phi_1$ between a first vector normal to a randomly selected point on the outer surface; and, a second vector which passes through the selected point and which is normal to a plane tangential to the graphic surface at the point of intersection of the second vector with the graphic surface; has substantially unity probability of exceeding 45°. Preferably, the cover's outer surface is textured such that the probability distribution of the angle $\phi_1$ for points on the outer surface is substantially 0 if $\phi_1$ is less than 45°; has a maximum value at a selected angle; and, is substantially 0 for values of $\phi_1$ which differ from the selected angle by more than a selected deviation angle of less than about 10°.

The cover is preferably also in optical contact with the graphic surface. If such contact is impossible or undesirable then the cover may also have a minutely textured inner surface such that an angle $\phi_2$ between: a third vector normal to a randomly selected point on the inner surface; and, a fourth vector which passes through the selected inner surface point and which is normal to a plane tangential to the graphic surface at the point of intersection of the fourth vector with the graphic surface; is greater than or equal to:

$$45° + \tfrac{1}{2}(\phi_{min} - \sin^{-1}((1/n) \sin \phi_{min}))$$

where "n" is the refractive index of the cover material, and $\phi_{min}$ is the greatest angle for which it is true for substantially all points on the cover's outer surface that $\phi_1 > \phi_{min}$.

The average vertical displacement from the bottoms of recesses in the cover's outer surface, to the apices of protrusions from the cover's outer surface, preferably exceeds about fifty times the wavelength of light. Advantageously, the average vertical displacement aforesaid exceeds about 0.1 mm.

If protrusions from the cover's outer surface have apices of average width "e", then e/a is preferably less than about 0.02, where "a" is the average vertical displacement aforesaid.

Advantageously, the cover may comprise an array of parallel, longitudinal right angle prisms. A substrate of thickness "b" may be provided between the prisms and the graphic surface which is to be displayed. The substrate cover may be removably optically contactible with the graphic surface.

If the cover has both inner and outer textured surfaces then those surfaces may each advantageously comprise an array of parallel, longitudinal prisms; the sides of each of the prisms preferably being inclined at an angle of about 63° with respect to a plane beneath each prism and tangential to the graphic surface.

The invention also provides a "window" which may serve as a graphic surface display device or which may serve as a conventional window. The window comprises a substantially transparent material having minutely textured first and second surfaces which lie on opposed sides of a notional reference surface such that an angle $\phi_1$ between: a first vector normal to a randomly selected point on the first surface; and, a second vector which passes through the selected point and which is normal to a plane tangential to the reference surface at the point of intersection of the second vector with the reference surface; has substantially unity probability of exceeding 45°; and wherein an angle $\phi_2$ between: a third vector normal to a randomly selected point on the second surface; and, a fourth vector which passes through the selected second surface point and which is normal to a plane tangential to the reference surface at the point of intersection of the fourth vector with the reference surface; is greater than or equal to:

$$45° + \tfrac{1}{2}(\phi_{min} - \sin^{-1}((1/n) \sin \phi_{min}))$$

where "n" is the refractive index of the window material, and $\phi_{min}$ is the greatest angle for which it is true for substantially all points on the first surface that $\phi_1 > \phi_{min}$.

DETAILED DESCRIPTION OF THE PREFERRED EMBODIMENTS

Figure 1:
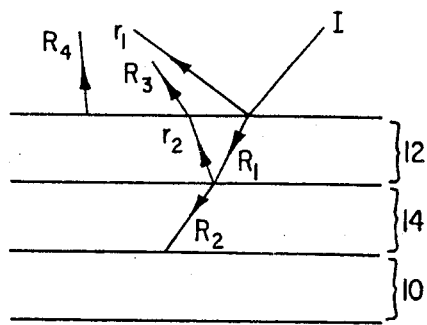
FIG. 1 is a cross-sectional side elevation view of a portion of a conventionally displayed graphic surface.

FIG. 1 depicts a prior art image display device in which a graphic surface 10 such as a painting, photograph, poster, print or the like is displayed beneath a protective sheet of transparent solid material (i.e. glass) 12. Glass 12 may be in optical contact with graphic surface 10, or there may be a small air gap 14 between the inner surface of glass 12 and the outer face of graphic surface 10. (By "optical contact", it is meant that any gaps between graphic surface 10 and glass 12 are very substantially less than the wavelength of light.) A human observer perceives graphic surface 10 by the reflection of incident light rays therefrom. An incident light ray "I" which strikes the outer surface of glass 12 is substantially refracted, along path "$R_1$", through glass 12 and is partially reflected, along path $r_1$, away from the outer surface of glass 12. Those skilled in the art will readily appreciate that the fresnel reflectivity of glass having a refractive index n=1.5 is such that at least 4% of the radiant energy of incident light ray I is reflected along path $r_1$. When refracted ray $R_1$ encounters the inner surface of glass 12, at least 4% of ray $R_1$ is similarly reflected therefrom along path $r_2$, the balance being refracted through glass 12 toward graphic surface 10 along path $R_2$.

When reflected ray $r_2$ encounters the outer surface of glass 12, a major portion thereof is refracted through glass 12 along path $R_3$, the balance (at least 4%) being reflected once again into glass 12. When refracted ray $R_2$ encounters graphic surfaces 10 it is reflected therefrom and the reflected ray (not shown) is similarly refracted and reflected by glass 12 to yield an emerging ray $R_4$ (the intermediate refraction and reflection paths are not shown). Ideally, the radiant energy of emerging rays reflected by graphic surface 10, such as ray $R_4$, is maximized; and, the radiant energy of emerging rays reflected by glass 12, such as rays $r_1$ and $R_3$, is minimized. However, as explained above, a transparent glass cover reflects at least 4% of incident light ray I along path $r_1$.

Figure 2:
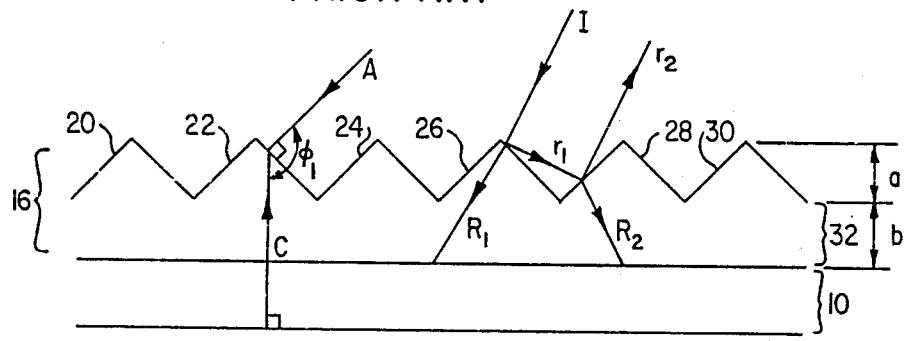
FIG. 2 is a cross-sectional side elevation view of a portion of a graphic surface display device according to the first embodiment of the invention.

Consider now FIG. 2 which is a side elevation view of a portion of a graphic surface display device constructed in accordance with the first embodiment of the invention. The graphic surface display device of FIG. 2 comprises a cover 16 having an outer surface formed of an array of parallel, longitudinal right angle prisms 20, 22, 24 . . . 30 overlying and in optical contact with graphic surface 10. An incident light ray "I" which, for example, strikes the outer surface of prism 26 as illustrated in FIG. 2 is substantially refracted through cover 16 along path $R_1$ to image 10 and is partially (at least 4%) reflected along path $r_1$ toward prism 28. When reflected ray $r_1$ encounters prism 28 it is in turn substantially refracted through prism 28 along path $R_2$ and partially (at least 4%) reflected by prism 28 along path $r_2$. If we assume the use of ideal materials to construct the graphic surface display devices of both FIGS. 1 and 2, then it will be appreciated that at least 4% of incident ray I is reflected along path $r_1$ in the prior art device of FIG. 1. However, only a small portion of a small portion (i.e. at least 4% of at least 4%, or at least 0.16 percent) of incident ray I is reflected along path $r_2$ in the embodiment of the invention illustrated in FIG. 2. Accordingly, the intensity of light reflected from the outer surface of cover 16 is substantially diminished, thus allowing light reflected from graphic surface 10 to dominate the observer's perception.

Although it is expected that, in practice, the advantages aforesaid will be easily attainable with the aid of a cover comprising an array of parallel, longitudinal right angle prisms such as cover 16 illustrated in FIG. 2, the use of prisms is not essential to attain the benefits of the invention. One need only place over and in optical contact with the graphic surface to be displayed a cover of substantially transparent material having a minutely textured outer surface such that an angle $\phi_1$ between a first vector A normal to a randomly selected point on the outer surface; and, a second vector C which passes through the selected point and which is normal to a plane tangential to the graphic surface at the point of intersection of the second vector with the graphic surface; has substantially unity probability of exceeding 45°. (It will be noted that neither graphic surface 10 nor cover 16 need be flat). Because it is physically impossible to construct prisms (or other objects) having perfectly sharpened apices, there will be small rounded or flattened apices on the prisms (or on the other objects which give the cover material its texture) where a normal vector will not satisfy the relationship aforesaid. However, such areas can be minimized; hence the use of the term "substantially unity probability". Moreover, those skilled in the art will appreciate that the term "normal" is used in relation to a surface in the sense that a vector is normal to the average slope of the surface over a characteristic distance which substantially exceeds the wavelength of light.

A preferred (but not essential) characteristic of the cover material, which assists in further obscuring any partially reflected images which may be present, is that its outer surface be textured such that the probability distribution of the angle $\phi_1$ for points on the cover's outer surface is substantially 0 if $\phi_1$ is less than 45°; has a maximum value at a selected angle; and, is substantially 0 for values of $\phi_1$ which differ from the selected angle by more than a selected deviation angle of less than about 10°.

To be optically effective it is necessary to ensure that the average vertical displacement from the bottoms of recesses in the outer surface of the cover material (i.e. the bottoms of the "V" grooves between adjacent prisms) to the apices of protrusions from the cover's outer surface (i.e. the apices of the prisms) exceeds about fifty times the wavelength of light. Advantageously, the average vertical displacement aforesaid exceeds about 0.1 mm. to inhibit entrapment of particulate matter between adjacent protrusions on the cover and facilitate cleaning of the cover's outer surface.

If the protrusions from the cover's outer surface have apices of average width "e" (i.e. "e" is a measure of the imperfection of the prisms or other objects used to form the cover material) and if the average vertical displacement aforesaid is "a" (see FIG. 2) then the ratio e/a is less than about 0.02 in order to minimize reflection from the apices of the protrusions.

Advantageously, the cover material may further comprise a highly conformable substrate 32 of thickness "b" which may be placed in optical contact with the outer face of the graphic surface to be displayed. To facilitate re-use of the cover it may be removably optically contactible with the outer face of the graphic surface. The dimension a+b is preferably less than about 0.5 mm. where "a" is the vertical displacement aforesaid. This minimizes distortion of the image caused by viewing the graphic surface through a prism.

As indicated above, a particularly preferred embodiment of the invention utilized a cover of substantially transparent material comprising an array of parallel, longitudinal right angle prisms. Optical lighting film sold under the trade mark SCOTCHCAL by 3M Company, St. Paul, Minn. is a suitable form of such material. The prisms in that material have bases of about 0.07 inches and height of about 0.03 inches. A substrate about 0.15 inches thick adjoins the prism bases.

Figure 3:
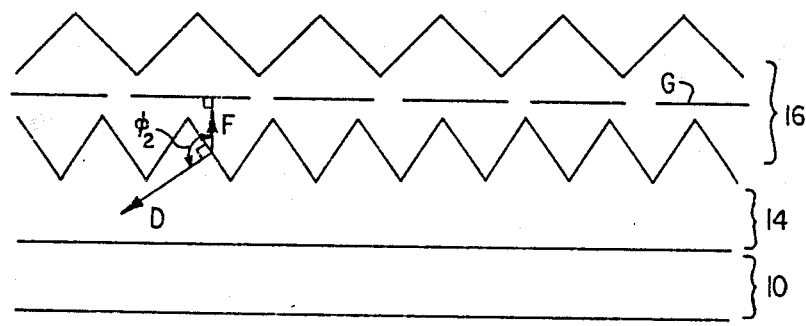
FIG. 3 is a cross-sectional side elevation view of a portion of a graphic surface display device according to the second embodiment of the invention.

In some situations it may be impractical to place cover 16 in optical contact with graphic surface 10. For example, graphic surface 10 may be too valuable or to fragile to risk such contact. In such situations cover 16 may be provided with a minutely textured inner surface, as well as a textured outer surface of the sort described above. Cover 16 is then placed over graphic surface 10, leaving an air gap 14 between the inner surface of cover 16 and graphic surface 10 as shown in FIG. 3 ( which assumes the use of prisms to texture the inner and outer surfaces of cover 16). More particularly, the inner surface of cover 16 is preferably textured such that an angle $\phi_2$ between a third vector D normal to a randomly selected point on the inner surface; and, a fourth vector F which passes through the selected inner surface point and which is normal to a plane tangential to a notional reference surface G located between the inner and outer surfaces of cover 16 (once again it is noted that neither graphic surface 10 nor cover 16 need be flat), at the point of intersection of the fourth vector with the reference surface; is greater than or equal to:

$$45° + \tfrac{1}{2}(\phi_{min} - \sin^{-1}((1/n) \sin \phi_{min}))$$

where "n" is the refractive index of the cover material and $\phi_{min}$ is the greatest angle for which it is true for substantially all points on the outer surface that $\phi_1 > \phi_{min}$, where $\phi_1$ is the angle described above with reference to the outer surface of cover 16.

It can be shown that an especially interesting situation occurs where $\phi_1 = \phi_2 =$ about 63°. This angle satisfies the foregoing criteria. Moreover, since the prisms on both surfaces are equal, the optical clarity of cover 16 is enhanced. Furthermore, rays originating in the normal direction and refracted within cover 16 can be shown to be parallel to the opposed prism sides, hence facilitating extremely clear image transmission. It will readily be appreciated that the cover of FIG. 3 is of general utility and may, for example, serve as a conventional window as well as part of a graphic surface display device of the sort depicted in FIG. 3.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A graphic surface display device, comprising:
   (a) a graphic surface to be displayed; and,
   (b) a cover of substantially transparent material overlying said graphic surface, said cover having a minutely textured outer surface wherein an angle $\phi_1$ between:
   (i) a first vector normal to a randomly selected point on said outer surface; and,
   (ii) a second vector which passes through said selected point and which is normal to a plane tangential to said graphic surface at the point of intersection of said second vector with said graphic surface;
   has substantially unity probability of exceeding 45°.

2. A graphic surface display as defined in claim 1, wherein said cover is an optical contact with said graphic surface.

3. A graphic surface display device as defined in claim 2, wherein said cover is removably optically contactible with said graphic surface.

4. A graphic surface display device as defined in claim 2, wherein said cover comprises an array of parallel, longitudinal prisms.

5. A graphic surface display device as defined in claim 4, wherein said prisms are right angle prisms.

6. A graphic surface display device as defined in claim 4, wherein the height of said prisms exceeds about 50 times the wavelength of light.

7. A graphic surface display device as defined in claim 4, wherein:
   (a) said prisms have apices of average width "e"; and,
   (b) e/a is less than about 0.02, where "a" is the height of said prisms.

8. A graphic surface display device as defined in claim 4, wherein the height of said prisms exceeds about 0.1 mm.

9. A graphic surface display device as defined in claim 4, wherein said cover further comprises a substrate of thickness "b" between said prisms and said graphic surface.

10. A graphic surface display device as defined in claim 9, wherein "b" is about 0.15 inches.

11. A graphic surface display device as defined in claim 9, wherein a+b is less than about 0.5 mm., where "a" is the height of said prisms.

12. A graphic surface display device as defined in claim 9, wherein said substrate is removably optically contactible with said graphic surface.

13. A graphic surface display device as defined in claim 4, wherein said prisms have a base of about 0.07 inches and a height of about 0.03 inches.

14. A graphic surface display device as defined in claim 1, wherein said outer surface is textured such that the probability distribution of said angle for points on said outer surface:
   (a) is substantially 0 if said angle is less than 45°;
   (b) has a maximum value at a selected angle; and,
   (c) is substantially 0 for angles which differ from said selected angle by more than a selected deviation angle of less than about 10°.

15. A graphic surface display device as defined in claim 14, wherein the average vertical displacement from the bottoms of recesses in said surface, to the apices of protrusions from said surface, exceeds about 50 times the wavelength of light.

16. A graphic surface display device as defined in claim 14, wherein:
   (a) protrusions from said outer surface have apices of average width "e"; and,
   (b) e/a is less than about 0.02, where "a" is the average vertical displacement from the bottoms of recesses in said outer surface to the apices of said protrusions.

17. A graphic surface display device as defined in claim 14, wherein the average vertical displacement from the bottoms of recesses in said outer surface, to the apices of protrusions from said outer surface, exceeds about 0.1 mm.

18. A graphic surface display device as defined in claim 14, wherein said cover further comprises a substrate of thickness "b" between said outer surface and said graphic surface.

19. A graphic surface display device as defined in claim 18, wherein a+b is less than about 0.5 mm., where "a" is the average vertical displacement from the bottoms of recesses in said outer surface to the apices of protrusions from said outer surface.

20. A graphic surface display device is defined in claim 18, wherein said cover substrate is removably optically contactible with said graphic surface.

21. A graphic surface display device as defined in claim 1, said cover further comprising a minutely textured inner surface wherein an angle $\phi_2$ between:
   (i) third vector normal to a randomly selected point on said inner surface; and,
   (ii) a fourth vector which passes through aid selected inner surface point and which is normal to a plane tangential to said graphic surface at the point of intersection of said fourth vector with said graphic surface;
is greater than or equal to:

$$45° + \tfrac{1}{2}(\phi_{min} - \sin^{-1}((1/n) \sin \phi_{min}))$$

wherein "n" is the refractive index of said material, and $\phi_{min}$ is the greatest angle for which it is true for substantially all points on said outer surface that $\phi_1 > \phi_{min}$.

22. A graphic surface display device as defined in claim 21, wherein said inner and outer surfaces each comprises an array of parallel, longitudinal prisms.

23. A graphic surface display device as defined in claim 22, wherein the sides of each one of said prisms is inclined at an angle of about 63° with respect to a plane beneath said one prism and tangential to said graphic surface.

24. A window comprising a substantially transparent material having minutely textured, first and second surfaces on opposed sides of a notional reference surface, wherein an angle $\phi_1$ between:
   (i) a first vector normal to a randomly selected point of said first surface; and,
   (ii) a second vector which passes through said selected point and which is normal to a plane tangential to said reference surface at the point of intersection of said second vector with said reference surface;
has substantially unity probability of exceeding 45°; and wherein an angle $\phi_2$ between:
   (iii) a third vector normal to a randomly selected point on said second surface; and,
   (iv) a fourth vector which passes through said selected second surface point and which is normal to a plane tangential to said reference surface at the point of intersection of said fourth vector with said reference surface;
is greater than or equal to:

$$45° + \tfrac{1}{2}(\phi_{min} - \sin^{-1}((1/n) \sin \phi_{min}))$$

where "n" is the refractive index of said material, where $\phi_{min}$ is the greatest for which it is true for substantially all points on said first surface that $\phi_1 > \phi_{min}$.

25. A window as defined in claim 24, wherein said first and second surfaces each comprise an array of parallel, longitudinal prisms.

26. A window as defined in claim 25, wherein the sides of each one of said prisms is inclined at an angle of about 63° with respect to a plane beneath said one prism and tangential to said reference surface.

27. A window as defined in claim 24, wherein said surfaces are textured such that the probability distribution of either of said angles $\phi_1$ or $\phi_2$ for points on said surfaces:
   (a) is substantially 0 if said angle is less than 45°;
   (b) has a maximum value at a selected angle; and,
   (c) is substantially 0 for angles which differ from said selected angle by more than a selected deviation angle of less than about 10°.

* * * * *